(12) United States Patent
Valentin

(10) Patent No.: US 8,046,382 B2
(45) Date of Patent: Oct. 25, 2011

(54) METHOD AND SYSTEM FOR SOFTWARE OBJECT PROFILE MANAGEMENT

(75) Inventor: Marco Valentin, Malsch (DE)

(73) Assignee: SAP AG, Walldorf (DE)

( * ) Notice: Subject to any disclaimer, the term of this patent is extended or adjusted under 35 U.S.C. 154(b) by 248 days.

(21) Appl. No.: 11/837,551

(22) Filed: Aug. 13, 2007

(65) Prior Publication Data
US 2009/0049009 A1    Feb. 19, 2009

(51) Int. Cl.
*G06F 17/30* (2006.01)
*G06F 9/44* (2006.01)

(52) U.S. Cl. ........................................ 707/802; 717/113

(58) Field of Classification Search .................. None
See application file for complete search history.

(56) References Cited

U.S. PATENT DOCUMENTS

| | | | |
|---|---|---|---|
| 2006/0174131 A1* | 8/2006 | Prager | 713/182 |
| 2007/0168962 A1* | 7/2007 | Heinke et al. | 717/120 |
| 2007/0174310 A1* | 7/2007 | Arrouye et al. | 707/100 |
| 2007/0203956 A1* | 8/2007 | Anderson et al. | 707/203 |

* cited by examiner

*Primary Examiner* — Tarek Chbouki

(57) ABSTRACT

Disclosed is a method and system for retrieving a software object based on a query and customizing a metadata of the software object by adding a property, a property value, a search key and a search key value to the metadata. An index is created on the software object based on the search key value and the metadata and the software object is persisted.

16 Claims, 8 Drawing Sheets

Display of entries found

Table Entry  Edit  Goto  System  Help

Table to be searched: TASU_FLAG

Number of hits: 30

Runtime: 0    Maximum no. of hits: 500

| LANGU | FLAG | TXT | Count. |
|---|---|---|---|
| DE | FLAG01 | Analyserport | |
| DE | FLAG02 | Korrekturreport | |
| DE | FLAG03 | Datenbankanderungen | |
| DE | FLAG04 | Buchen nach Teslauf | |
| DE | FLAG05 | Lange Laufzeit | |
| DE | FLAG06 | Testlauffahig | |
| DE | FLAG07 | Selektionsbild | |
| DE | FLAG08 | Wiederaufsetbar | |
| DE | FLAG09 | Hintergrundfahig | |
| DE | FLAG10 | Spezielle Berechtigugen notig | |
| DE | FLAG11 | Ausgabeliste online | |
| DE | FLAG12 | Ausgabeliste batch | |
| DE | FLAG13 | Ausgabeliste weiterverwendbar | |
| DE | FLAG14 | Upgraderelvant | |
| DE | FLAG15 | Erzeugt Customizing | |
| EN | FLAG01 | Analysis Report | |
| EN | FLAG02 | Correction Report | |
| EN | FLAG03 | Database changes | |
| EN | FLAG04 | Posting after testrun | |
| EN | FLAG05 | Long runtime | |
| EN | FLAG06 | Testrunflag available | |
| EN | FLAG07 | Selection screen | |
| EN | FLAG08 | Re-run-able | |
| EN | FLAG09 | Batch run possible | |
| EN | FLAG10 | Special authority checks | |
| EN | FLAG11 | Result list online | |
| EN | FLAG12 | Result list batch | |
| EN | FLAG13 | Result list usable externally | |
| EN | FLAG14 | Necessary for upgrade | |
| EN | FLAG15 | Creates Customizing | |
| | | | 30 |

505

METHOD AND SYSTEM FOR SOFTWARE OBJECT PROFILE MANAGEMENT

FIELD OF THE INVENTION

The invention generally relates to the field of data management and more specifically to management of a metadata of a software object.

BACKGROUND OF THE INVENTION

A software application includes various software objects such as a software program, a database, a function module, a package, a structure, a database table, and a database view. In order to manage the software application efficiently, it may be essential to know various details of the software objects involved in the software application. An understanding of the details such as a purpose of the software object, database tables the software object makes a read/write operation on, methods called by the software object, troubleshooting details in case there is a problem in executing in the software application, person responsible for the software object and error fixing procedure for the software object are typically required to manage the software application efficiently. These details are typically a functional characteristic of the software object. The details above typically form a metadata of the software object, that is, information about the software object. The software application may have a number of software objects involved, each of them serving a specific purpose of the software application.

A software object profile management tool that allows an administrator of the software application to view the metadata of the software object is typically required to manage the software application efficiently. The software object profile management tool existing in the market typically deals with a system generated metadata of the software object such as a created on date, a created by name, a last changed on date, a last changed by name, name of a system the software object belongs to, and a package name of the software object. These system generated metadata is typically not enough to manage the software application efficiently since it does not contain the functional characteristic details such as a purpose of the software object, a database table affected by the software object, a function module called, and others. The software object profile management tool typically does not allow a user to customize the metadata of the software object by adding the above mentioned functional characteristic details. The software object profile management tool also does not allow the user to search for the software object by a customized metadata attribute. Thus, the software object profile management tool typically does not allow the administrator to manage the metadata of the software object in a systematic and an organized way so as to manage the software application efficiently.

SUMMARY OF THE INVENTION

What is described is a method and system for retrieving a software object based on a query and customizing a metadata of the software object by adding a property, a property value, a search key and a search key value to the metadata. An index is created on the software object based on the search key value and the metadata and the software object is persisted.

BRIEF DESCRIPTION OF THE DRAWINGS

FIG. 5 is an example screen display of a property list of a software object according to an embodiment of the invention.

DETAILED DESCRIPTION

What is described is a method and system for retrieving a software object based on a query and customizing a metadata of the software object by adding a property, a property value, a search key and a search key value to the metadata. An index is created on the software object based on the search key value and the software object and the metadata is persisted. Unlike the metadata such as a type of the software object, a size of the software object, and a created on date of the software object which are typically system generated and not customizable by a user, the property and the search key that are added to the metadata by the user are customizable by the user.

The metadata of the software object is customized typically to classify the software object based on a functional characteristic and various attributes of the software object. The metadata typically forms a part of a profile of the software object. The profile of the software object typically specifies a purpose, a functional characteristic and various attributes of the software object that includes the system generated metadata.

Figure 1:
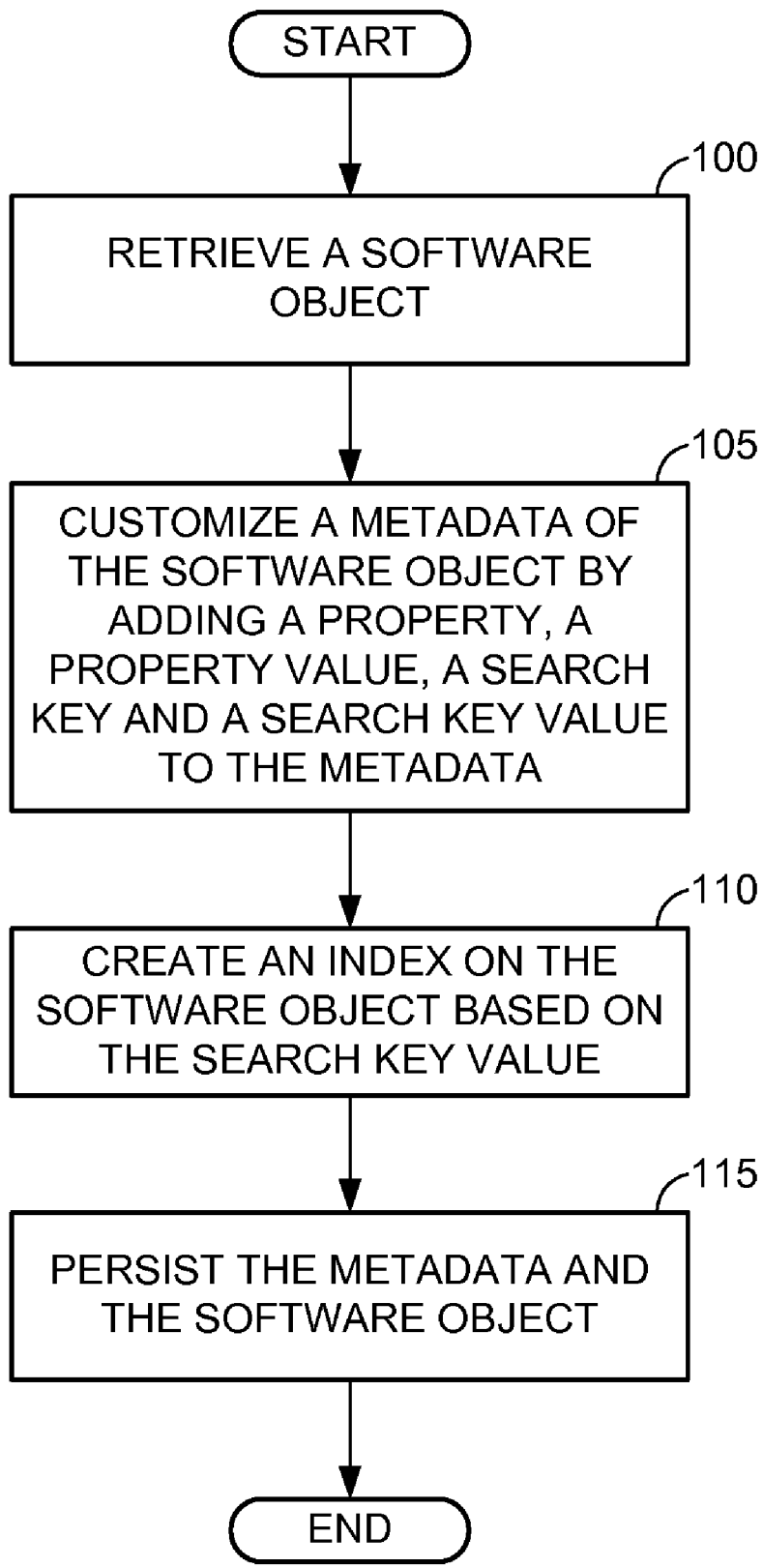
FIG. 1 is a flow diagram for customizing a metadata of a software object according to an embodiment of the invention.

FIG. 1 is a flow diagram for customizing a metadata of a software object according to an embodiment of the invention. At step 100, the software object is retrieved from a database based on a query. At step 105, the metadata of the software object is customized by adding a property, a property value, a search key and a search key value to the metadata. The property describes a functional characteristic of the software object and the search key describes an attribute of a profile of the software object. At step 110, an index is created on the software object based on the search key value. At step 115, the metadata and the software object is persisted in the database.

Figure 2:
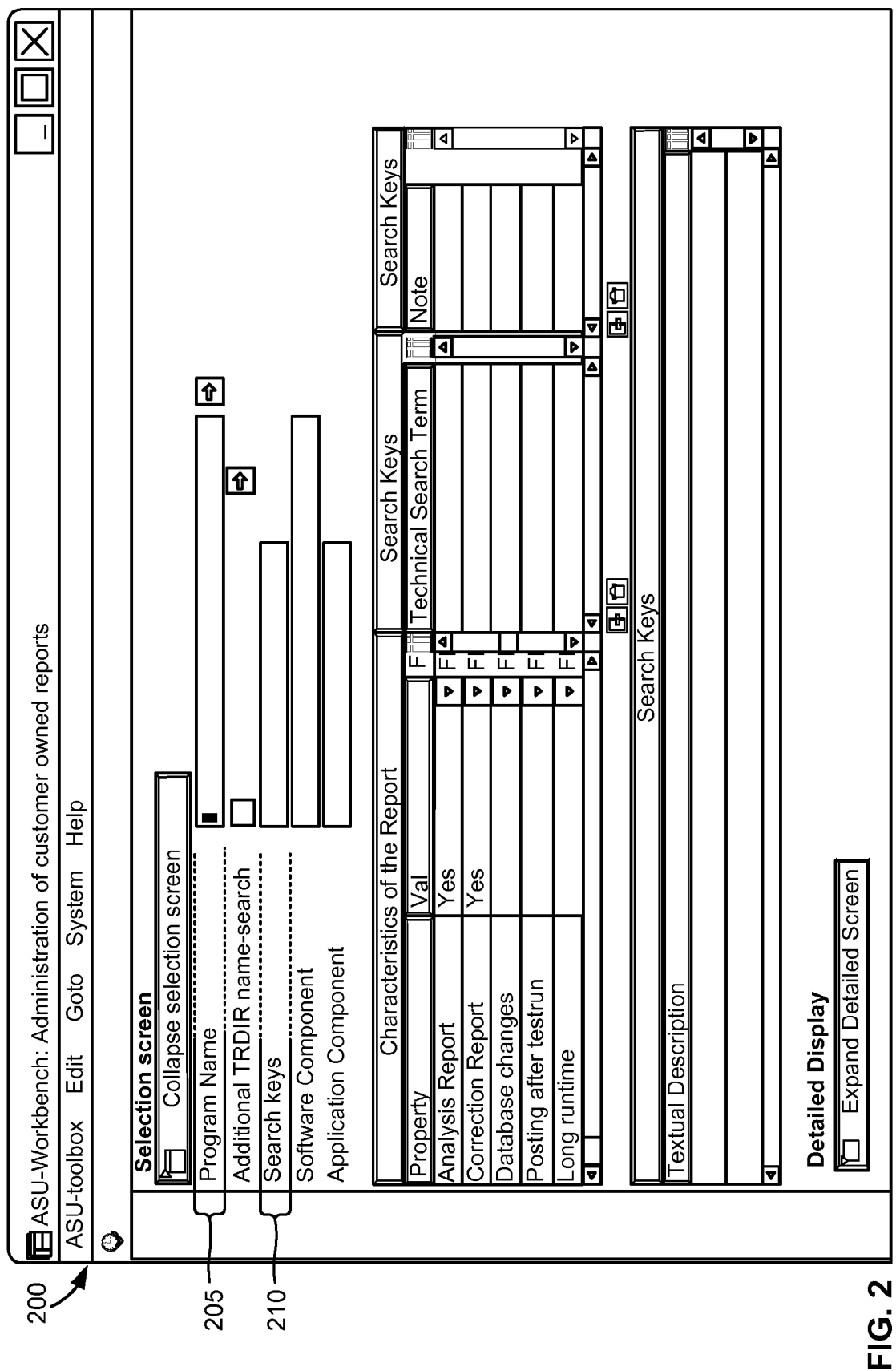
FIG. 2 is an example screen display of a software object profile management tool to retrieve a software object according to an embodiment of the invention.

FIG. 2 is an example screen display of a software object profile management tool 200 to retrieve a software object according to an embodiment of the invention. The software object is retrieved from a database based on a query. The query is constructed with parameters such as program name 205 and search keys 210. Program name 205 specifies a name of the software object. The query may be constructed with either program name 205 or search keys 210 or both.

Search keys 210 describes an attribute of a profile of the software object such as a name of a database table the software object makes a read/write operation or a name of a function module the software object uses. The software object may be searched using these attributes in search keys

210. The software object includes an object such as a software program, a data object, a database table, a query, a function module, and a structure.

Figure 3:
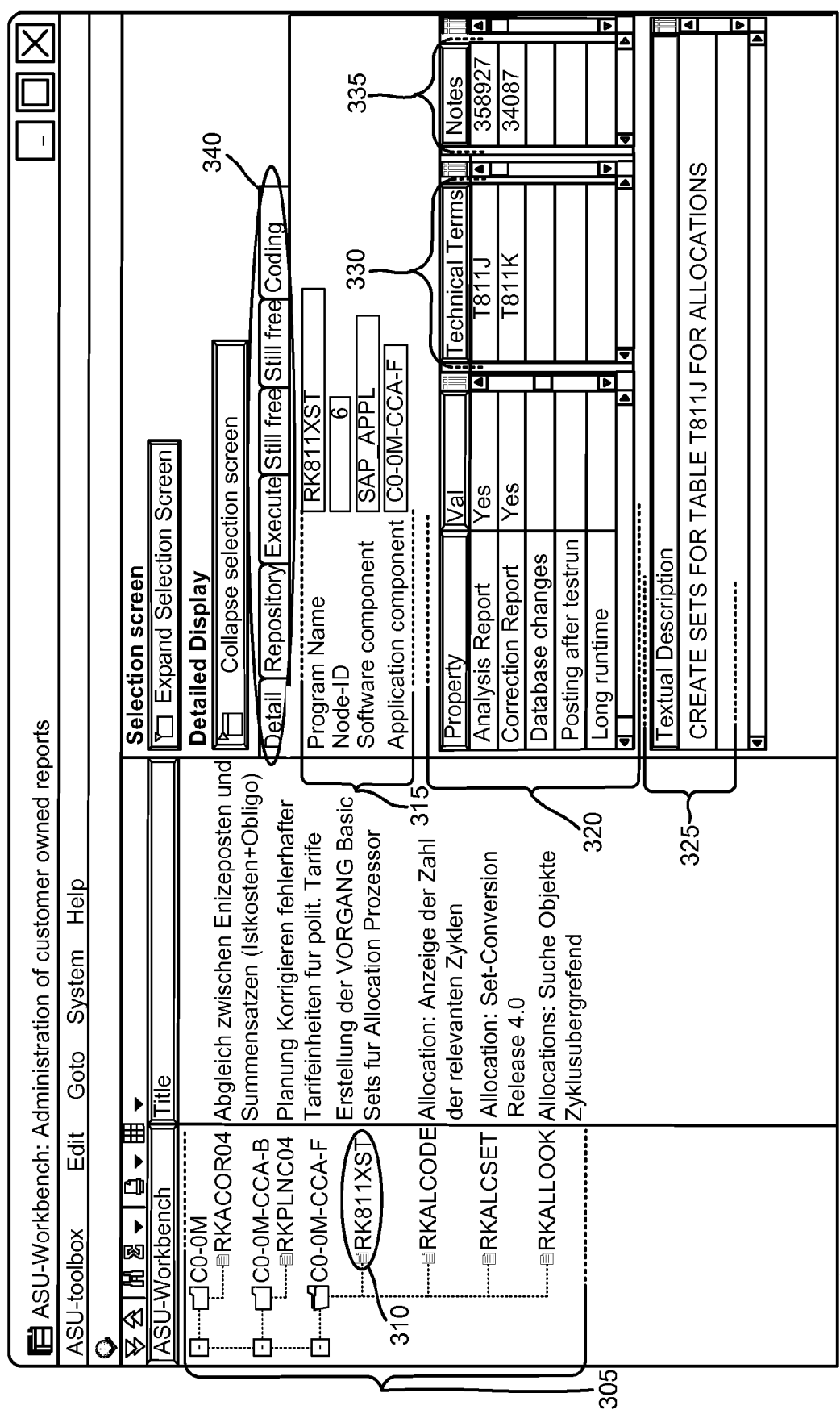
FIG. 3 is an example screen display of a software object profile management tool to view a metadata of a software object according to an embodiment of the invention.

FIG. 3 is an example screen display of a software object profile management tool 300 to view a metadata of a software object according to an embodiment of the invention. Software object profile management tool 300 displays a list of software objects 305 in a tree structure. Software object profile management tool 300 displays a profile of the software object "RK811XST" 310. The profile of the software object typically describes a purpose, a functional characteristic and various attributes of the software object. In an embodiment, "RK811XST" 310 is a software program to create sets for a database table for allocation. The profile of "RK811XST" 310 includes metadata attributes 315 such as a program name, a node identification of "RK811XST" 310, a software component and an application component to which "RK811XST" 310 belongs to.

The profile of "RK811XST" 310 also includes metadata attributes such as property 320, textual description 325, technical terms 330 and notes 335. Metadata attribute property 320 specifies a functional characteristic of the software object "RK811XST" 310 such as whether "RK811XST" 310 is an analysis program, a correction program, whether "RK811XST" 310 makes database changes and whether "RK811XST" 310 consumes more time to execute. Metadata attribute property 320 is typically used to classify the software object "RK811XST" 310 based on its functional characteristic.

Metadata attribute textual description 325 describes a purpose of the software object "RK811XST" 310. In an embodiment, the purpose of the software object "RK811XST" 310 is to create sets for a database table "T811J" for allocations. In another embodiment, textual description 325 may describe more than just the purpose of the software object.

Metadata attribute technical terms 330 specifies a related software object to "RK811XST" 310. The related software object may include a database table that "RK811XST" 310 performs a read/write operation on, another software program which "RK811XST" 310 depends on, a function module that "RK811XST" 310 uses, and a structure that "RK811XST" 310 uses. In an embodiment, "RK811XST" 310 makes a read/write operation on database tables "T811J" and "T811K" as shown in technical terms 330.

Metadata attribute note 335 specifies a note identification of a note for the software object "RK811XST" 310. The note contains a business specific information regarding the software object "RK811XST" 310 such as features of the software object, limitations of the software object, probable release date of next version of the software object, installation procedure, troubleshooting procedure, error fixing procedure, and attachments of the software object with error fixes.

Software object profile management tool 300 contains tab strip 340 that allows the user to perform a set of actions on the software object "RK811XST" 310. The user may view details of "RK811XST" 310, view repository details of "RK811XST" 310, execute "RK811XST" 310 and view source code of "RK811XST" 310 in software object profile management tool 300 using tab controls "Detail", "Repository", "Execute" and "Coding" in tab strip 340. The "Coding" tab control in tab strip 340 may display a source code of the software object if the software object is a software program, and may display a table definition if the software object is a database table.

Figure 4:
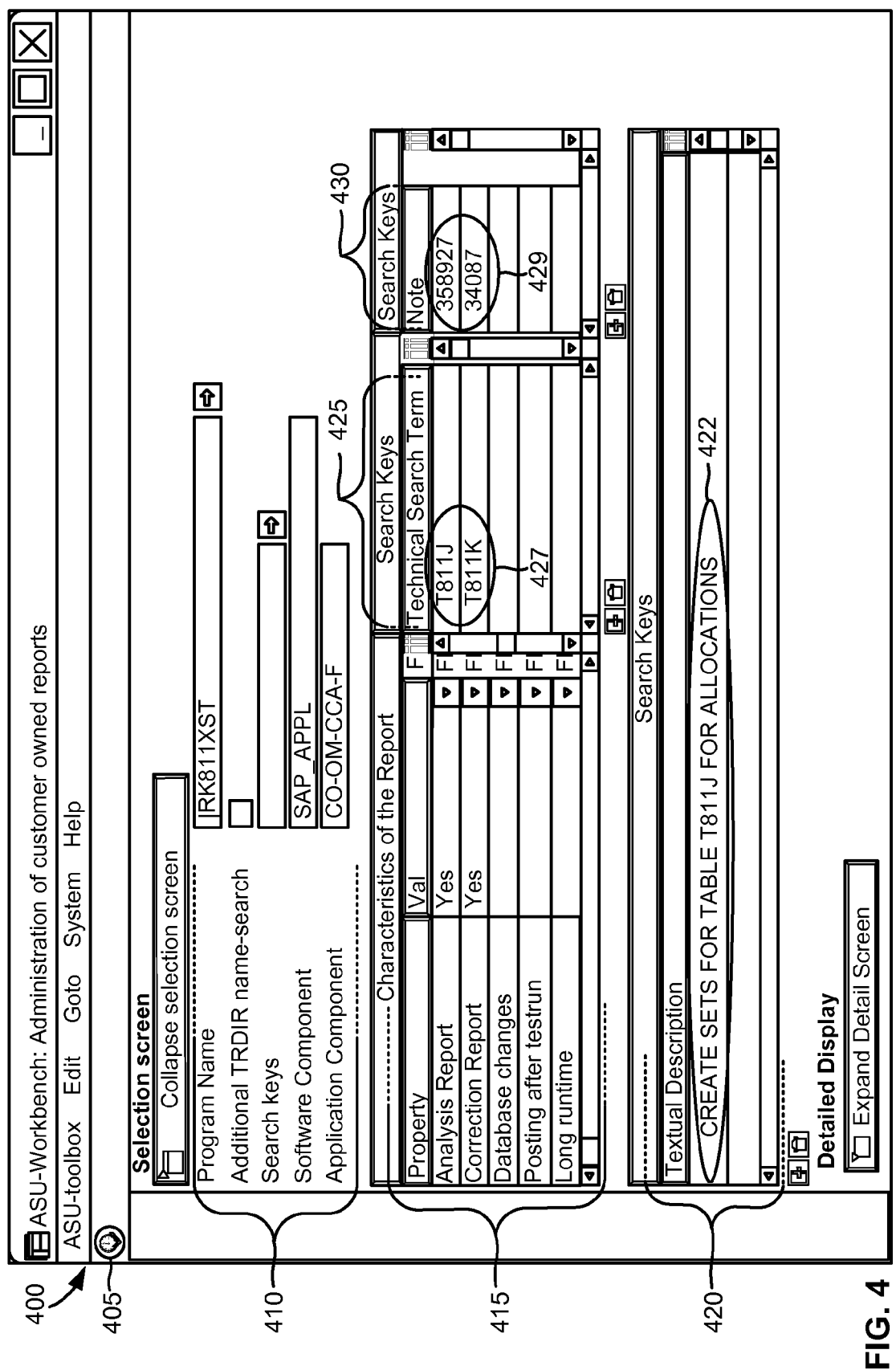
FIG. 4 is an example screen display of a software object profile management tool to customize a metadata of a software object according to an embodiment of the invention.

FIG. 4 is an example screen display of a software object profile management tool 400 to customize a metadata of a software object according to an embodiment of the invention. Software object profile management tool 400 allows a user to customize the profile of the software object "RK811XST" 310 by customizing the metadata of the software object "RK811XST" 310. Metadata attributes 410 such as a program name, a software component and an application component which are used for organizing the software object "RK811XST" 310 into a package hierarchy may be specified by the user. The software component may contain one or more application components. The software component and the application component of metadata attributes 410 specify the software component and the application component the software object "RK811XST" 310 belongs to. Metadata attributes 410 such as search keys are used as query parameters to retrieve the software object.

Metadata attribute such as property 415 that describes a functional characteristic of the software object "RK811XST" 310 may be specified by the user. The user may define a list of properties for the software object "RK811XST" 310 and specify a property value for each of the properties. For example, a property may be "Analysis Report" and a property value for this property may be "Yes" as shown in metadata attribute property 415. This property and the property value indicates that the software object "RK811XST" 310 is an analysis report program.

Metadata attribute such as textual description 420 that describes the purpose of the software object "RK811XST" 310 may be customized by the user. The user may also specify any other details of "RK811XST" 310 in the textual description. Similarly, metadata attributes such as technical terms 425 and note 430 may be customized by the user.

Metadata attributes textual description 420, technical search term 425, and note 430 are search keys for the software object "RK811XST" 310, that is, the software object "RK811XST" 310 may be searched and retrieved using the search keys and search key values such as search key value 422, search key value 427, and search key value 429 in the query. The significance of the search key is twofold:

One, the search key describes an attribute of the profile of the software object "RK811XST" 310 such as textual description 325 as described in FIG. 3, which is used to classify the software object and Two, the software object "RK811XST" 310 may be retrieved from the database based on search key values such as search key value 422, search key value 427, and search key value 429.

In an embodiment, after customizing the metadata of the software object "RK811XST" 310, the metadata and the software object "RK811XST" 310 may be persisted using a button save 405. An index is created on the software object "RK811XST" 310 based on the search key values when the metadata is persisted. The index enables searching and retrieving of the software object based on the search key value. Indexing typically makes searching more efficient and faster than searching the software object which is not indexed.

FIG. 5 is an example screen display of a property list of a software object according to an embodiment of the invention. The user may define a list of properties for the software object in property list 505 in software object profile management tool 500. Metadata attribute property 415 for the software object may be chosen from property list 505. Similarly, search keys textual description 420, technical terms 425, and note 430 are chosen from a search key list.

Figure 6:
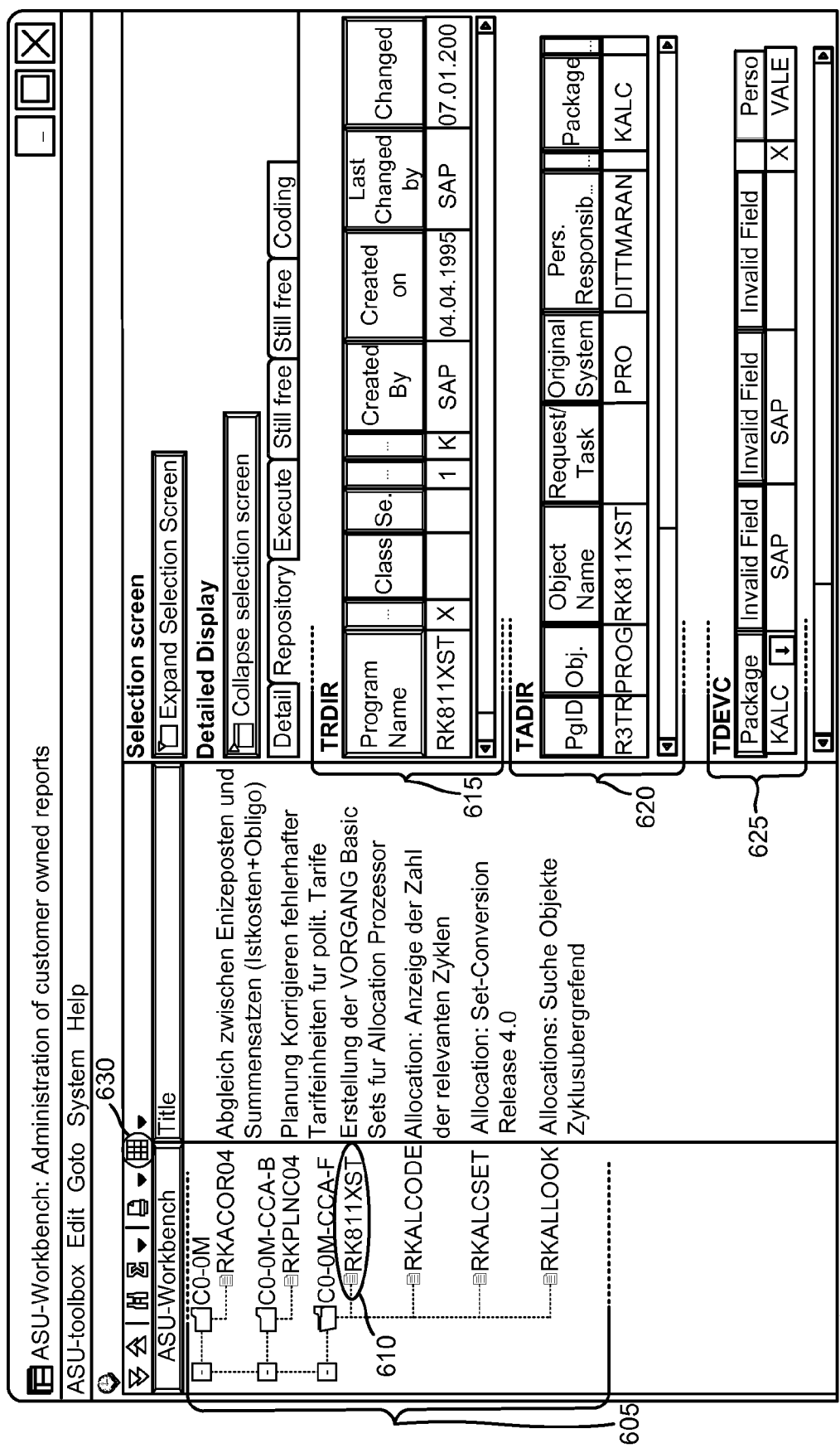
FIG. 6 is another example screen display of a software object profile management tool to view a metadata of a software object according to an embodiment of the invention.

FIG. 6 is another example screen display of a software object profile management tool 600 to view a metadata of a software object according to an embodiment of the invention. Software object profile management tool 600 displays a list of software objects 605. Software object profile management tool 600 also displays details of a repository that contains the software object "RK811XST" 610. Database table 615 typically contains details of the software object "RK811XST" 610 such as a created by name, a created on date, a last changed by name, and a last changed on date among other details. Database table 620 typically contains details such as object identification, program identification of the software object "RK811XST" 610, a system identification of a system that contains the software object "RK811XST" 610, a person responsible for "RK811XST" 610 and package to which "RK811XST" 610 belongs. Database table 625 typically contains details regarding a software package that contains the software object "RK811XST" 610.

Software object profile management tool 600 enables a user to generate a report containing information such as metadata attributes and repository details of the software object "RK811XST" 610. The software object "RK811XST" 610 may be fetched using search key 425, search key 430, and search key 435. In an embodiment, a report may be generated for software objects that make database changes on a database table "T811J". The report may contain just a list of software objects that make database changes on the database table "T811J" or may contain metadata attributes and repository details of all the software objects that makes database changes on the database table "T811J". In an embodiment, the report may be generated using button 630.

Figure 7:
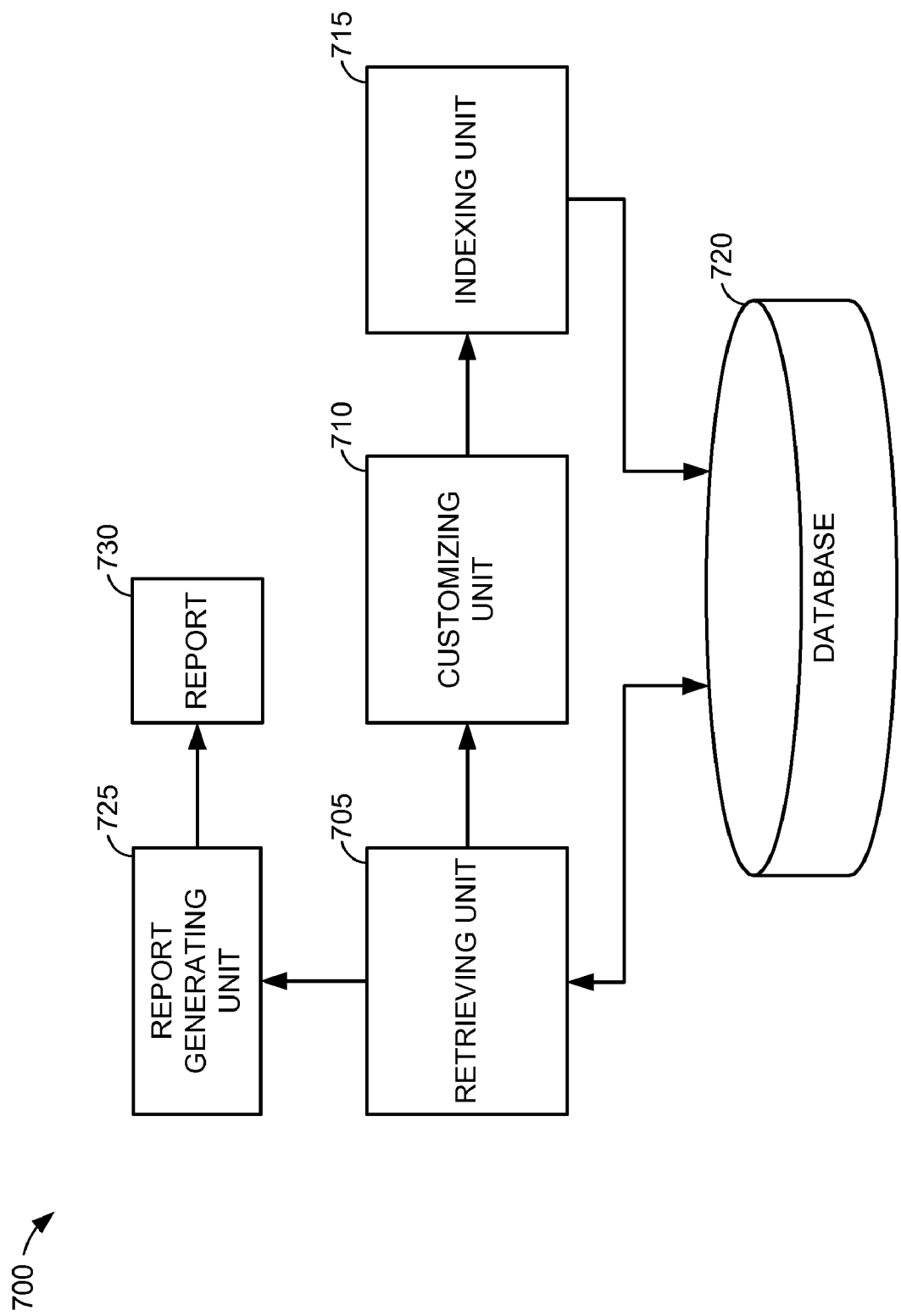
FIG. 7 is a block diagram of various components of a system for customizing a metadata of a software object according to an embodiment of the invention.

FIG. 7 is a block diagram of various components of a system for customizing a metadata of a software object according to an embodiment of the invention. Software object profile management system 700 includes a retrieving unit 705 that retrieves a software object from database 720 based on a query. The query may be constructed using a search key and a search key value as parameters. Customizing unit 710 customizes a metadata of the software object by adding a property, a property value, a search key and a search key value to the metadata of the software object. After the metadata of the software object is customized, an index is created on the software object by indexing unit 715. The index is created based on the search key value. The metadata of the software object and the software object is persisted in database 720. Report generating unit 725 fetches the software object using retrieving unit 705 and generates report 730 containing details of the metadata of the software object.

Figure 8:
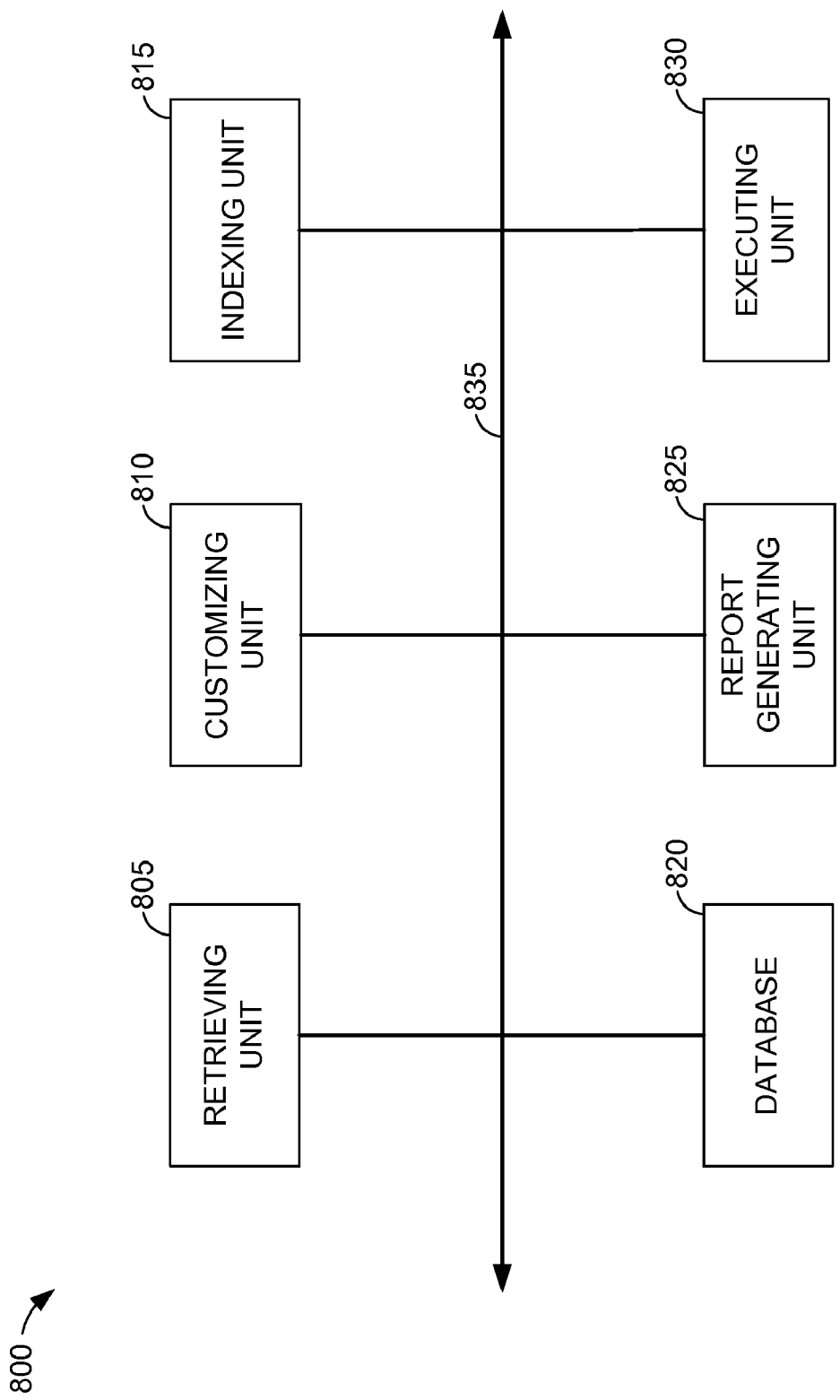
FIG. 8 is another block diagram of various components of a system for customizing a metadata of a software object according to an embodiment of the invention.

FIG. 8 is another block diagram of various components of a system for customizing a metadata of a software object according to an embodiment of the invention. Software object profile management system 800 includes retrieving unit 805, customizing unit 810, indexing unit 815, database 820, report generating unit 825 and executing unit 830 communicating with each other via system bus 835. Retrieving unit 805 retrieves a software object from database 820 based on a query. Customizing unit 810 customizes a metadata of the software object by adding a property, a property value, a search key and a search key value to the metadata of the software object. After the metadata of the software object is customized, an index is created on the software object by indexing unit 815. The index is created based on the search key value. The metadata of the software object and the software object is persisted in database 820. Report generating unit 825 generates a report containing details of the metadata of the software object. In an embodiment, executing unit 830 executes the software object if the software object is a software program.

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a machine-readable medium for storing the machine executable instructions. The machine-readable medium is an article of manufacture and may include, but is not limited to, flash memory, optical disks, CD-ROMs, DVD ROMs, RAMs, EPROMs, EEPROMs, magnetic or optical cards any other type of machine-readable media suitable for storing electronic instructions. For example, the present invention may be downloaded as a computer program which may be transferred from a remote computer (e.g., a server) to a requesting computer (e.g., a client) by way of a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A method, comprising:
   in a user interface displaying at least some metadata of a software object, wherein the software object is a part of a software application, receiving a user input editing at least one attribute of the metadata of the software object, wherein the at least one attribute is a property of the software object and a value associated with the property, and the property comprises a functional characteristic of the software object;
   in the user interface displaying the metadata, receiving a user input adding a plurality of search key values to the metadata, the plurality of search key values comprising attributes of profiles of the software object, wherein a first search key value is a textual description to describe a purpose of the software object, a second search key value is a technical search term to specify a database table that the software object performs a read/write operation on, and a third search key value is a note identifier to specify a note identification of business specific information for the software object;
   indexing the software object and the associated metadata based on the plurality of search key values; and
   persisting the modified metadata including the plurality of search key values and the software object according to the indexing.

2. The method in claim 1, wherein the software object is retrieved by a query based on the plurality of search key values.

3. The method in claim 1, wherein editing the property comprises obtaining the property from a property list.

4. The method in claim 1, wherein adding the plurality of search key values to the metadata comprises obtaining the plurality of search key values from a search key values list.

5. The method in claim 1, wherein the metadata comprises an attribute of the software object selected from a group consisting of a created on date, a created by name, a last changed date, a database table the software object belongs to, a name of a person responsible for the software object, and a system containing the software object.

6. The method in claim 1 further comprising, generating a report containing the metadata of the software object.

7. The method in claim 1, wherein the software object comprises an object selected from a group consisting of a business object, a database table, a query, a software program, a function module, and a software package.

8. A computer system including at least one processor and memory storing program code, the code comprising:
- a retrieving unit to retrieve a software object based on a query;
- a customizing unit electronically coupled to the retrieving unit to customize a metadata of the software object by editing at least one attribute of the metadata of the software object, wherein the at least one attribute is a property of the software object and a value associated with the property to the metadata, and the property comprises a functional characteristic of the software object, and by adding a plurality of search key values to the metadata, the plurality of search key values comprising attributes of profiles of the software object, wherein a first search key value is a textual description to describe a purpose of the software object, a second search key value is a technical search term to specify a database table that the software object performs a read/write operation on, and a third search key value is a note identifier to specify a note identification of business specific information for the software object;
- an indexing unit electronically coupled to the customizing unit to create an index of the software object and the associated metadata based on the plurality of search key values; and
- a database electronically coupled to the customizing unit to persist the modified metadata including the plurality of search key values and the software object according to the index.

9. The system in claim 8, further comprising a report generating unit electronically coupled to the database to generate a report containing the metadata of the software object.

10. The system in claim 8, further comprising an executing unit electronically coupled to the retrieving unit to execute the software object.

11. The system in claim 8, where in the retrieving unit, the customizing unit, the indexing unit and the database are electronically coupled to a system bus.

12. An article of manufacture, comprising:
- a non-transitory machine readable medium having instructions which when executed by a machine cause the machine to:
  - receive a user input editing at least one attribute of a metadata of a software object, wherein the at least one attribute is a property of the software object and a value associated with the property, and the property comprises a functional characteristic of the software object;
  - receive a user input adding a plurality of search key values to the metadata, the plurality of search key values comprising attributes of profiles of the software object wherein a first search key value is a textual description to describe a purpose of the software object, a second search key value is a technical search term to specify a database table that the software object performs a read/write operation on, and a third search key value is a note identifier to specify a note identification of business specific information for the software object;
  - index the software object and the associated metadata based on the plurality of search key values; and
  - persist the modified metadata including the plurality of search key values and the software object according to the index.

13. The article of manufacture in claim 12, wherein the machine readable medium provides further instructions, which when executed by a machine cause the machine to generate a report containing the metadata of the software object.

14. The article of manufacture in claim 12, wherein the software object comprises an object selected from a group consisting of a business object, a database table, a query, a software program, a function module, and a software package.

15. The article of manufacture in claim 12, wherein the machine readable medium provides further instructions, which when executed by a machine cause the machine to retrieve the software object by a query based on the plurality of search key values.

16. The article of manufacture in claim 12, wherein the metadata comprises an attribute of the software object selected from a group consisting of a created on date, a created by name, a last changed date, a database table the software object belongs to, a name of a person responsible for the software object, and a system containing the software object.

* * * * *